(12) United States Patent
Russell et al.

(10) Patent No.: US 8,662,421 B2
(45) Date of Patent: Mar. 4, 2014

(54) ADJUSTABLE FLUIDIC SPRAYER

(75) Inventors: Gregory Russell, Baltimore, MD (US); Dan Steerman, Harpers Ferry, WV (US)

(73) Assignee: Bowles Fluidics Corporation, Columbia, MD (US)

( * ) Notice: Subject to any disclaimer, the term of this patent is extended or adjusted under 35 U.S.C. 154(b) by 0 days.

(21) Appl. No.: 11/101,001

(22) Filed: Apr. 7, 2005

(65) Prior Publication Data

US 2006/0226266 A1  Oct. 12, 2006

(51) Int. Cl.
*B05B 1/08* (2006.01)
(52) U.S. Cl.
USPC .................. 239/589.1; 239/284.1; 239/289; 239/600
(58) Field of Classification Search
USPC ........... 239/284.1, 284.2, 463, 464, 518, 521, 239/524, 552, 556, 589, 589.1, 600
See application file for complete search history.

(56) References Cited

U.S. PATENT DOCUMENTS

| | | | |
|---|---|---|---|
| 3,185,166 A | 5/1965 | Horton | 137/81.5 |
| 3,563,462 A | 2/1971 | Bauer | 239/456 |
| 3,791,584 A | 2/1974 | Drew et al. | 239/237 |
| 4,052,002 A | 10/1977 | Stouffer | 239/4 |
| 4,088,269 A * | 5/1978 | Schlick | 239/133 |
| 4,151,955 A * | 5/1979 | Stouffer | 239/11 |
| 4,157,161 A | 6/1979 | Bauer | 239/11 |
| 4,231,519 A | 11/1980 | Bauer | 239/4 |
| 4,398,664 A | 8/1983 | Stouffer | 239/11 |
| 4,463,904 A | 8/1984 | Bray | 239/284 |
| 4,508,267 A | 4/1985 | Stouffer | 239/11 |
| 4,515,315 A * | 5/1985 | Corsette | 239/491 |
| 4,562,867 A | 1/1986 | Stouffer | 137/811 |
| 4,944,457 A | 7/1990 | Brewer | 239/242 |
| 5,035,361 A | 7/1991 | Stouffer | 239/589.1 |
| 5,181,660 A | 1/1993 | Stouffer et al. | 239/589.1 |
| 5,213,269 A | 5/1993 | Srinath et al. | 239/589.1 |
| 5,577,664 A | 11/1996 | Heitzman | 239/99 |
| 5,749,525 A | 5/1998 | Stouffer | 239/284.1 |
| 5,820,034 A | 10/1998 | Hess | 239/589.1 |
| 5,845,845 A | 12/1998 | Merke et al. | 239/1 |
| 5,906,317 A | 5/1999 | Srinath | 239/284.1 |
| 5,971,301 A | 10/1999 | Stouffer et al. | 239/589.1 |
| 6,186,409 B1 | 2/2001 | Srinath et al. | 239/1 |
| 6,240,945 B1 | 6/2001 | Srinath et al. | 137/14 |
| 6,253,782 B1 | 7/2001 | Raghu | 137/14 |
| 6,354,515 B1 * | 3/2002 | Matsumoto et al. | 239/284.1 |
| 6,360,965 B1 | 3/2002 | Clearman | 239/222.19 |
| 6,575,386 B1 * | 6/2003 | Thurber et al. | 239/418 |
| 6,805,164 B2 | 10/2004 | Stouffer | |
| 7,316,362 B2 * | 1/2008 | Miyauchi | 239/102.1 |
| 2003/0178506 A1 * | 9/2003 | Kondou | 239/284.1 |
| 2003/0234303 A1 * | 12/2003 | Berning et al. | 239/589.1 |

* cited by examiner

*Primary Examiner* — Jason Boeckmann
(74) *Attorney, Agent, or Firm* — J.A. McKenney & Assoc., LLC

(57) ABSTRACT

An improved fluidic spray device that includes: (a) a base having boundary surfaces including top, bottom and side edge surfaces, (b) a plurality of projections extending from a base boundary surface chosen from the group consisting of its top and bottom surfaces, wherein these projections are configured and spaced so as to provide the interior geometry of the flow passages for a fluidic circuit having a power nozzle and an interaction region located downstream of the power nozzle, and (c) wherein the flow passages that are proximate the base edges having no sidewalls to form edge boundaries for these flow passages.

9 Claims, 5 Drawing Sheets

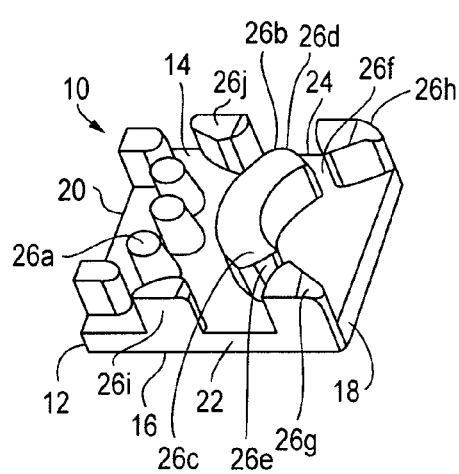
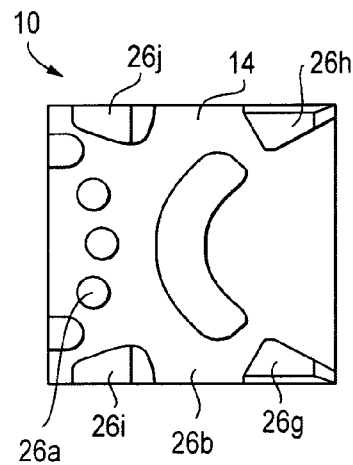
FIG. 1(a)  FIG. 1(b)
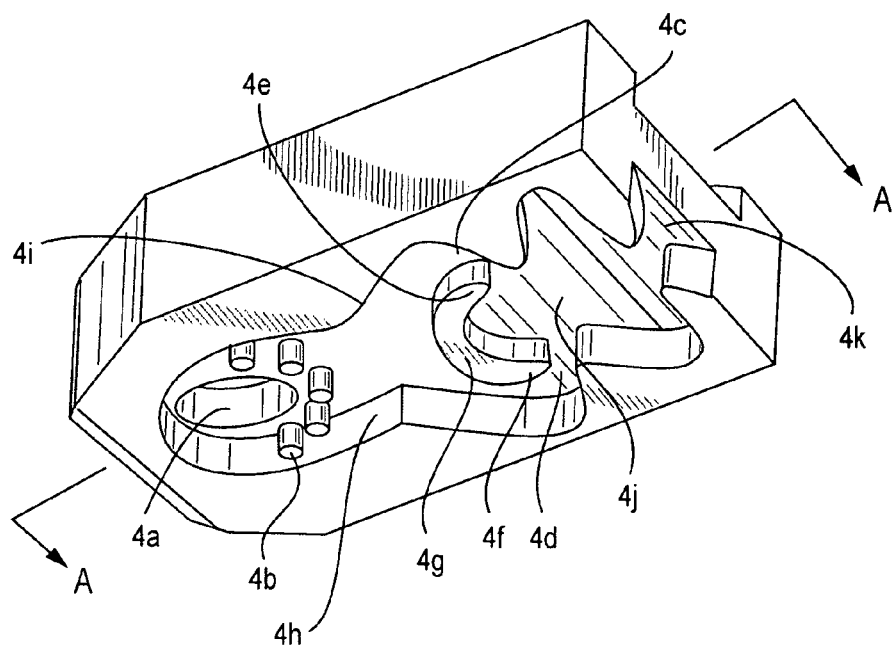
FIG. 2
(PRIOR ART)

Section A-A

ADJUSTABLE FLUIDIC SPRAYER

BACKGROUND OF THE INVENTION

1. Field of the Invention

This invention relates to fluid handling processes and apparatus. More particularly, this invention relates to new methods and apparatus for distributing the flow of fluid from a fluidic insert or oscillator.

2. Description of the Related Art

Fluidic inserts or oscillators are well known for their ability to provide a wide range of distinctive liquid sprays. The distinctiveness of these sprays is due to the fact that they are characterized by being oscillatory in nature, as compared to the relatively steady state flows that are emitted from standard spray nozzles.

U.S. Pat. No. 4,052,002 (Stouffer & Bray) shows in its FIG. 5 one of the characteristic flow patterns that can be achieved with a fluidic oscillator. This fluidic oscillator is shown in the typical manner—that is, only some form of its top or bottom views is presented as it is assumed that it is essentially a two-dimensional device for which such views are sufficient to reveal the internal geometry of its fluid passages or fluidic circuit. Common features of such a fluidic circuit include: (a) a fluid source inlet, (b) at least one power nozzle configured to accelerate the movement of the fluid that flows under pressure through the insert, (c) a fluid pathway that connects the fluid source inlet and the power nozzle/s, (d) an interaction chamber downstream of the power nozzle and through which the fluid flows and in which the fluid flow phenomena is initiated that will eventually lead to the flow from the insert being of an oscillating nature, (e) feedback or control passages (see FIG. 5's indicia 18 and 19 which mark the entries to these feedback passages), and (f) a fluid outlet or throat from which the fluid exits the fluidic oscillator or insert.

Despite much prior art relating to the development of fluidic inserts and fluidic circuits, the nature of the housings or enclosures that surround fluidic inserts and the methods for mounting fluidic inserts had, until recently, changed only slowly over the years. Representative examples of the housings for fluidic inserts and the methods for mounting them are described in U.S. Pat. Nos. 6,062,491, 7,014,131, 5,845,845, 6,464,150 and in U.S. Patent Publication Nos. 2004-0227021, 2004-0164189, 2006-0108442 and 2006-0043110, which are incorporated herein by reference in their entirety.

As fluidic inserts have continued to be used in more types of applications, the need has arisen to fabricate them and their housing so that they can be located in and incorporated into ever diminishing size spaces. Thus, the opportunity has arisen to re-examine and improve upon the technology involved in such fluidic inserts and the methods for mounting them.

OBJECTS AND ADVANTAGES

There has been summarized above, rather broadly, the prior art that is related to the present invention in order that the context of the present invention may be better understood and appreciated. In this regard, it is instructive to also consider the objects and advantages of the present invention.

It is an object of the present invention to provide improved and more versatile fluidic inserts which can be used to help meet the smaller size constraints that continued to be placed upon fluid spray devices.

It is a further object of the present invention to provide improved and more versatile fluidic inserts that will enable the spray devices which use them to be used in a wider range of service applications.

It is an object of the present invention to provide novel methods for mounting for fluidic inserts that can be helpful in improving upon the actual spray performance of the spray devices or nozzle assemblies that utilize fluidic oscillators.

It is also an object of the present invention to provide fluidic spray assemblies (i.e., fluidic oscillators with their enclosures) that can provide specific types of desired sprays that have heretofore not been achievable with conventional fluidic technology.

These and other objects and advantages of the present invention will become readily apparent as the invention is better understood by reference to the accompanying summary, drawings and the detailed description that follows.

SUMMARY OF THE INVENTION

Recognizing the need for the development of improved fluidic spray devices that can better address the unique surface wetting challenges and problems associated with automotive sprayers, the present invention is generally directed to satisfying the needs set forth above and overcoming the disadvantages identified with prior art devices and methods.

In accordance with the present invention, the foregoing need can be satisfied by providing a fluidic spray device that in a first preferred embodiment includes the following elements: (a) a base having boundary surfaces including top, bottom and side edge surfaces, (b) a plurality of projections extending from a base boundary surface chosen from the group consisting of its top and bottom surfaces, wherein these projections are configured and spaced so as to provide the interior geometry of the flow passages for a fluidic circuit having a power nozzle and an interaction region located downstream of the power nozzle, and (c) wherein the flow passages that are proximate the base edges having no sidewalls to form edge boundaries for these flow passages.

In a second preferred embodiment, this devise further includes a secondary housing having an outer surface that includes a front and a rear face, an intermediate boundary surface that connects these faces, and a housing passage having interior walls that extends between the faces, with this housing passage having a definable front and a rear portion. The intersection of the housing passage's rear portion with the rear face of the housing forms the opening to a cavity formed by the interior walls of the housing passage's rear portion. Additionally, the housing passage's front portion is configured so as to form a throat whose intersection with the housing's front face forms an outlet from which the spray which flows from the device issues.

Thus, there has been summarized above, rather broadly, the present invention in order that the detailed description that follows may be better understood and appreciated. There are, of course, additional features of the invention that will be described hereinafter and which will form the subject matter of the claims to this invention.

BRIEF DESCRIPTION OF THE DRAWINGS

FIGS. 1(*a*)-1(*b*) show, respectively, a perspective and a top view of a preferred embodiment of the present invention. Shown is a fluidic insert or device 10 that has a top surface 14 that is configured, in this instance, according to the fluidic circuit geometry disclosed in U.S. Pat. No. 6,253,782 (although it should be noted that many of the fluidic circuits previously mentioned in the "Related Art" section of this application could have served as guidance for the configuring the top surface of this device) and which is shown herein in FIG. 2 as constructed in the traditional manner and without the novel aspects of the fluidic oscillator shown in FIGS. 1(a)-1(b).

FIG. 2 illustrates a fluidic oscillator having a similar mushroom oscillator circuit as disclosed in FIGS. 1(a)-1(b), but where the FIG. 2 oscillator significantly differs from that shown in FIGS. 1(a)-1(b) in that FIG. 2's flow passages have sidewalls which add to the overall width of this oscillator as compared to that shown in FIGS. 1(a)-1(b).

FIGS. 3(a)-3(b) show a perspective and a cross-sectional view of a secondary housing that is suitable for use with the insert shown in FIG. 1(a).

FIGS. 4(a)-4(b) show a perspective and a cross-sectional view of a primary housing that is suitable for use with the secondary housing shown in FIG. 3.

FIG. 5 (a) shows another preferred embodiment of the present invention.

FIGS. 5(b)-5(d) show, respectively, a perspective view of a housing that is suitable for use with this insert, and top and cross-sectional views of this housing and the insert located within this housing.

Figure 8A:
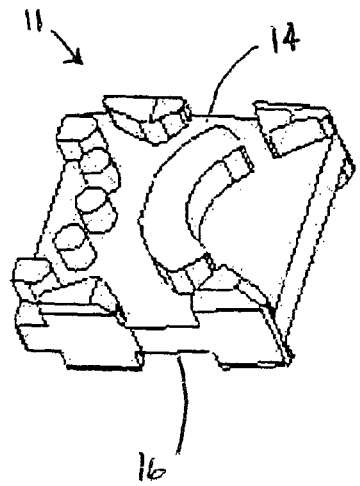
Figure 8B:
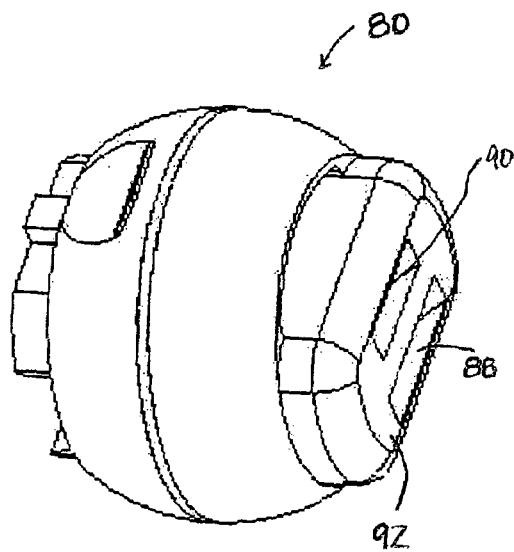

FIGS. 8(a) and 8(b) show, respectively, a perspective view of a side-less, double spray, fluidic device and the "dual throat" housing in which this device is inserted.

Figure 8C:
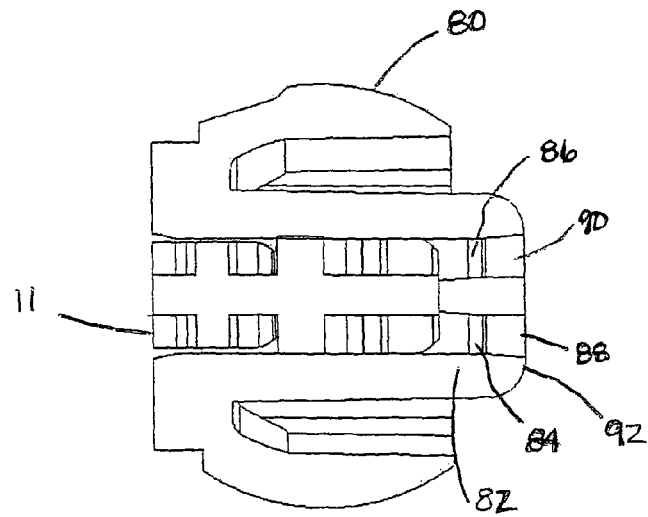

FIG. 8(c) shows a cross-sectional, side view of the housing of FIG. 8(b) with the device of FIG. 8(a) inserted.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

We have discovered unique methods and means for improving the performance of fluidic oscillators that must adhere to strict size and configuration requirements, such as those encountered in providing sprayers for automotive applications where, in addition to the cosmetically dictated size and configuration requirements, there are often very demanding requirements for the surface wetting properties of the sprays that flow from such sprayers.

A common problem encountered in developing and producing fluidic oscillators or inserts for use in automotive windshield applications is designing a fluidic circuit which can give the desired spray characteristics (e.g., at flow rates of 400 ml/minute and operating pressures of 9 psig, uniform coverage with spray droplets of a target area located approximately 25 cm in front of the sprayer and having a target area width of approximately 80 cm) and which can be fitted onto the top or bottom surface of a fluidic insert that is constrained to have only a very limited width (e.g., typical acceptable widths are on the order of 8-9 mm).

Since such inserts are typically made by plastic injection molding methods, those knowledgeable with such manufacturing methods will understand that such methods impose further constraints on the geometry of such inserts. For example, a 8 mm wide fluidic insert has only about 6 mm width of room on its top or bottom surface for accommodating a fluidic circuit since the wall thickness of such pieces must typically be about 1 mm or larger.

FIGS. 1(a)-1(b) show, respectively, a perspective and a top view of a preferred embodiment of the present invention. Shown is a fluidic insert or device 10 that has a top surface 14 that is configured, in this instance, according to the fluidic circuit geometry disclosed in U.S. Pat. No. 6,253,782 (although it should be noted that many of the fluidic circuits previously mentioned in the "Related Art" section of this application could have served as guidance for the configuring the top surface of this device).

This fluidic device 10, which we denote herein as a "sideless or wall-less" fluidic insert, consists of a base 12 which has boundary surfaces which include a top 14, bottom 16, parallel front 18; and rear 20 surfaces or faces, a straight right side 22 surface and a straight left side 24 surfaces that is parallel to the right side 22 surface; additionally this device has a centerline that extends between its front and rear surfaces. The separation distance between the parallel right 22 and left 24 sides defines the essentially uniform width of this base for a fluidic insert. The separation distance between its parallel front 18 and rear 20 surfaces as measured along the device's centerline defines the length of this base for a fluidic insert. Its top surface has projections 26 which extend solely above and perpendicular to the device's base so as to not further increase the width of the base, and whose height and shape are dictated by the requirement that these projections make up the internal components or flow passages of a fluidic circuit whose actual configuration can take any one of the many previously referenced designs that are known for fluidic circuits.

Meanwhile, the design of the fluidic circuit of U.S. Pat. No. 6,253,782 is seen to have the common features of: a fluid source inlet 4a, five filter posts 4b which serve to capture any large-size debris particles in the circuit's flowing liquid that could clog the smaller downstream orifices or flow passages, two power nozzles 4c, 4d that are formed at the edges 4e, 4f of a somewhat streamline-shaped barrier 4g which stretches almost all the way from the circuit's right 4h to its left 4i sidewall, an interaction chamber 4j downstream of the power nozzles and through which the liquid flows and in which the fluid flow phenomena is initiated that will eventually lead to the flow from the insert being of an oscillating nature, and a fluid outlet 4k or throat from which a liquid exits this circuit. Note that it is the sidewalls 4h, 4i of this representative standard insert which ultimately requires it to be wider than the present invention since the present invention, as explained further below, has no such comparable sidewalls at the edges 22, 24 of its base 12.

Returning to FIGS. 1(a)-1(b) and the present invention, we see that its top surface projections 26 provide the fluidic circuit elements seen in FIG. 2: filter posts 26a, a streamlined barrier 26b which extends over most of the width between the top surface's right 22 and left 24 sides and whose edges 26c, 26d serve to form the inner part of two power nozzles 26e, 26f whose outer parts are formed by two nozzle-forming posts 26g, 26h located proximate the sides 22, 24, and two upstream-of-the-barrier posts 26i, 26j that directly extend inward from the sides 22, 24 and which serve to implement only a portion of the preferred geometry of the flow-stream section between the filter posts 26a or the fluid flow source and the barrier 26b or power nozzles 26e, 26f. Additionally, it should also be noted in FIG. 1 that these projections which are located at the base's edges 22, 24 do not include anything that serves as sidewalls (similar to 4h, 4i of FIG. 2) or edge boundaries for the flow passages of the device's fluidic circuit. It is the lack of these sidewalls in the present invention that allows the width of this base and ultimately the device to be reduced.

The present invention's fluidic circuit could also have had appropriately shaped throat posts located proximate its front surface 18 so as to form the throat that is a characteristic feature of these fluidic circuits. However, for this embodiment, these features have been made a part of the front portion of a secondary housing passage into which this base 12 is press fitted.

Figure 3A:
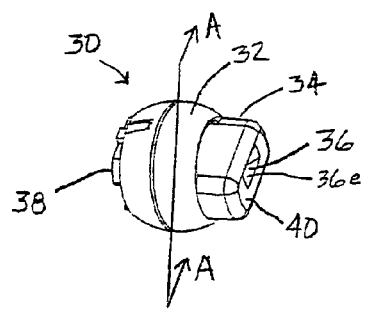
Figure 3B:
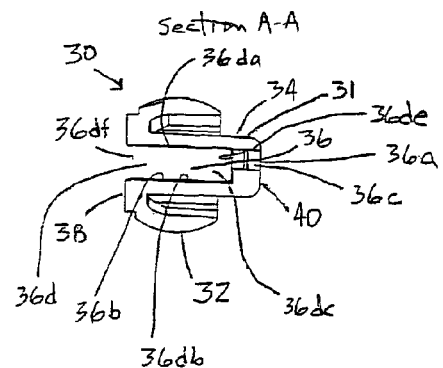

Shown in FIG. 3(a)-3(b) is an example of such a secondary housing 30. It is characterized by having an outer surface 34 that includes a front 40 and a rear 38 face, an intermediate boundary surface 31 that connects these faces and has a portion 32 with spherical-shaped curvature. It 30 also has a passage 36 having interior walls 36b that extend between the faces, with this passage having especially configured front 36c and rear 36d portions. The intersection of this rear portion with the rear face of this housing forms the opening 36df to a cavity formed by the interior walls of this passage rear portion, wherein this cavity can be seen in FIG. 3(b) to have planar top 36da, bottom 36db, right and left 36de sidewalls and a front face 36de. This cavity is configured for the from-the-rear, press-fitable mounting of the base into the housing such that the base's front surface 18 is proximate and adjoins the cavity's front face 36de. The separation distance between this passage's front face 36de and the secondary housing's rear 38 face as measured along the passage's centerline defines the depth of the passage's rear portion and impacts the length of the base of the fluidic insert that would be suitable for use with this secondary housing. The front portion 36c of this passage is especially configured so as to form the throat section of a fluidic circuit whose intersection with the housing's front face forms an outlet 36a from which spray issues. Thus, the fluidic insert that would be appropriate for use with this secondary housing would not have such a throat section or fluidic circuit element.

Figure 4A:
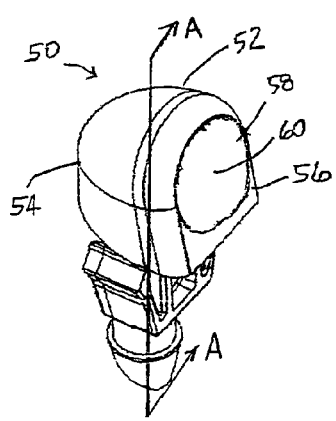
Figure 4B:
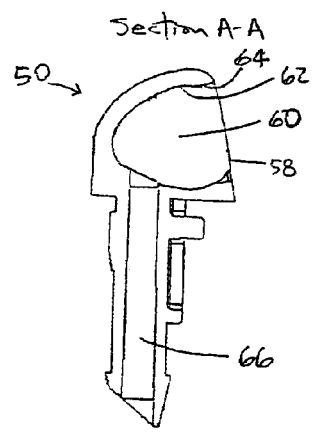

FIGS. 4(a)-4(b) show an example of the primary housing 50 into which the secondary housing could be fitted. It has a top 52 outer surface which is aerodynamically streamlined from its rear 54 to its front 56 face. This front face has an opening 58 to a cavity 60 which extends into the body of this housing 50. A portion 62 of this cavity's inner surface 64 is configured to form a socket so that this cavity can accommodate the ball shaped portion 32 of the secondary housing 30. An orifice 66 extends from the bottom of this cavity to allow a liquid to flow into this housing.

This combination of secondary and primary housings is seen to provide an end-user of such spray devices with the ability to set a plurality of directional orientations of the secondary housing's outlet 36a relative to that of the primary housing 50. Thus, the combination allows for an end-user to manually adjust the direction of the spray which issues from this device.

It can be noted that this combination of housings was made effectively possible (i.e., recall that such devices have very strict geometry and size restrictions that they must meet) by the realization that the task of providing sidewalls for the incorporated fluidic circuit could be handled by the walls of the secondary housing's cavity. This allows for the addition of an additional boundary wall within such a device without the device exceeding its width constraints. Note also that the flexibility of adjusting this device's spray direction means that the overall width of the incorporated fluidic circuit need not be as large as those found in conventional applications since the width of the spray's wetted area can be reduced since most target areas can now be more effectively addressed by more precisely aiming the direction of this device's spray.

In other applications in which this spray directional adjustability feature is not needed, the use of the side-less fluidic spray devices disclosed herein allows for the overall width of such sprayers to be reduced.

Figure 5A:
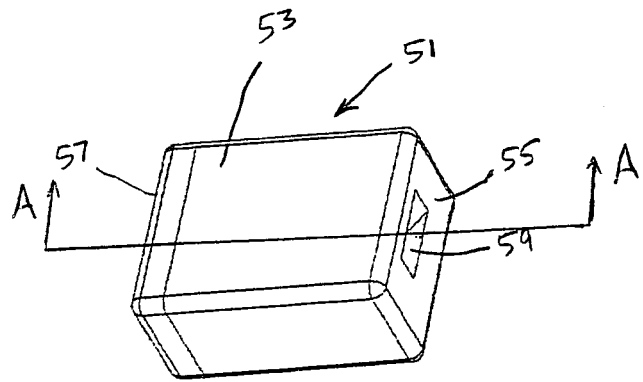
Figure 5B:
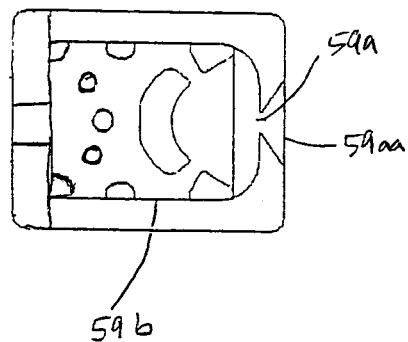
Figure 5C:
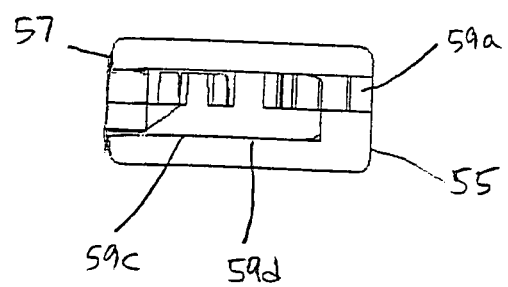

FIGS. 5(a)-5(c) show, respectively, perspective, top and cross-sectional views of an example of an alternative "rear loading" housing which is suitable for use with the insert shown in FIG. 1. This secondary housing 51 has an outer surface 53 that includes a front 55 and a rear 57 face, a passage 59 having interior walls that extend between the faces, with this passage having especially configured front 59a and rear 59b portions. The intersection of this rear portion with the rear face of this housing forms the rear opening 59c to a cavity 59d formed by the interior walls of this passage rear portion. The front portion 59a of this passage is especially configured so as to form the throat section of a fluidic circuit whose intersection with the housing's front face forms a front opening or outlet 59aa from which spray issues.

It can be noted that the use of this "rear-loading" housing also has the benefit of eliminating the spurious sprays (i.e., "streamers") that could previously appear at the front edges of a fluidic insert's contact points with its surrounding housing.

An additional benefit of this type of housing is that it allows for fabrication techniques to be employed in the construction of such plastic molded parts which result in it being easier to modify the critical design features of such housings. For example, small design feature changes to commercially produced, standard fluidic inserts usually means making changes to the depths and fan angles of such fluidic circuits by employing assorted grinding operations on the steel molds which are used to make such pieces. Such changes usually limit fan and deflection angle changes to 3 degrees or less.

With a fluidic circuit throat being integrated into the housing, changes to this throat can now be made by employing a blade device in the housing's throat. It has been found that such blade devices can make changes to the throat that yield fan angle changes of 30 degrees and deflection angle changes of 4 degree or more.

A still further advantage of this type of housing, since a throat no longer has to be an element of the to-be-inserted insert's fluidic circuit, is that the insertion depth to which the fluidic insert is inserted into its housing can be easily varied. This effectively allows one to control the length of a fluidic circuit's interaction chamber (i.e., the distance between the fluidic circuit's power nozzles/s and the entrance to its throat), which provides one a further means to affect the fan angle of the sprays which issue from such devices.

Figure 6A:
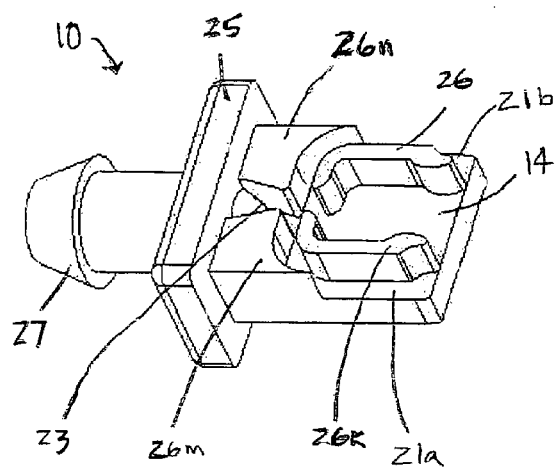
FIG. 6 (a) shows a perspective view of another preferred embodiment of the present invention.
FIG. 6(b) shows a housing that is suitable for enclosing the insert shown in FIG. 6(a).
Figure 6B:
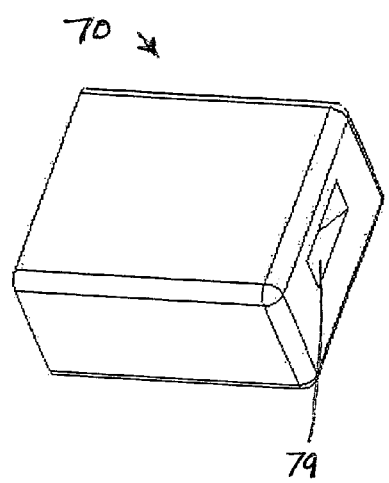

FIGS. 6 (a)-6(b) show another preferred embodiment of the present invention in combination with an appropriate housing. FIG. 6(a) shows a perspective view of a side-less fluidic device having a fluid intake or nipple and a fluidic circuit geometry that differs from that previously seen. It has a top surface 14 that is configured according to the fluidic circuit geometry generally disclosed in U.S. Pat. No. 4,052, 002 (what is herein referred to as a "feedback" fluidic circuit). It has side barrier projections 26k, 26l on its top surface that define the circuit's interaction chamber. It also has entry projections 26m, 26n that define the upstream ends of this circuit's feedback loops 21a, 21b while also forming an orifice 23 by which liquid enters the device. The outer edge surfaces of the side barrier projections also serve as the inner walls of the feedback loops 21*a*, 21*b* that are used to control the fluid flow phenomena in the interaction chamber. This device also has on its rear face a vertical member 25 that is configured so that it can serve as the rear face or end surface of the primary housing 51. The circuit's orifice 23 extends through this member 25 and has an intake nipple 27 attached to the member's rear side which serves to aid in connecting a liquid intake line to this device.

The secondary housing 70 for this embodiment is similar to that previously shown in FIG. 5 (i.e., its passage 79 has a front and a rear portion, with the rear portion having a cavity of accommodate the device and a front portion with a built-in throat), except that this housing is open on its rear face. This opening is closed by the fluidic device's vertical member 25.

Figure 7A:
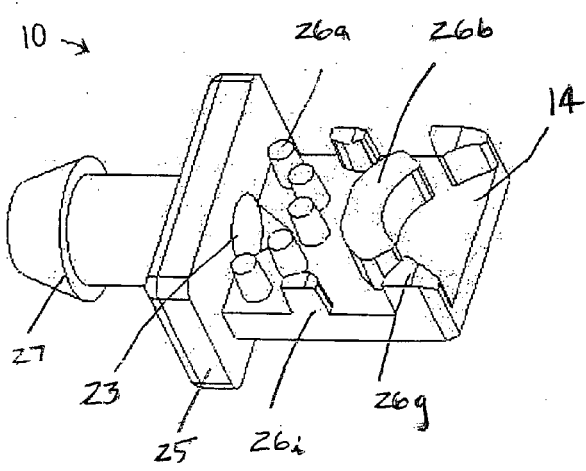
FIG. 7(a) shows a similar version of the preferred embodiment previously seen in FIGS. 5(a), except that this version shows the fluidic device having a vertical member on its rear face which serves as its housing's end surface.
Figure 7B:
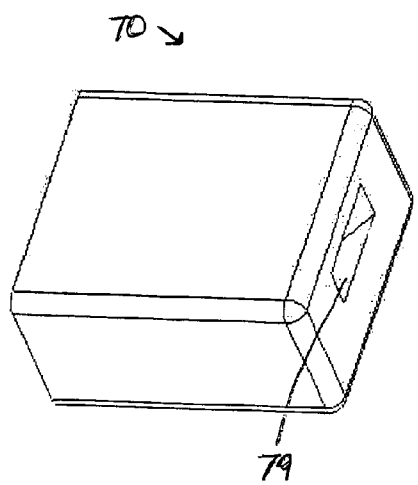
FIG. 7(b) shows a suitable housing for the insert shown in FIG. 7(a)

FIG. 7(*a*) shows a similar version of the preferred embodiment previously seen in FIG. 1, except that this version shows the fluidic device having a vertical member 25 on its rear face which serves as its housing's end surface. FIG. 7(*b*) shows a suitable housing for this insert.

The methods of the present invention have also been combined with "double spray" insert technology to yield yet another embodiment of the present invention. FIGS. 8(*a*) and 8(*b*) show, respectively, a perspective view of the present invention's side-less, double spray, fluidic device 11 and the "dual throat" housing 80 that has been configured to house such a device.

This housing 80 is similar to that shown in FIG. 3, except that its front portion 82 has been provided with two "built-in throat" passages 84, 86 which are parallel to each other and which have orifices 88, 90 in the housing's front face 92. FIG. 8(*c*) shows a cross-sectional, side view of the fluidic device 11 inserted into its housing 80. The dual throat nature of the front portion of this housing is clearly seen.

It can be noted that the widths of this housing's orifices 88, 90 are different, the bottom orifice 88 being wider than the top orifice 90. This difference serves to allow for the creation of top and bottom sprays having differing horizontal fan angles. Many other differences between these sprays can be made by making other changes to the flow paths of the two sprays. For example, one could simply construct this fluidic device so that its top and bottom surfaces use different fluidic circuits. As previously noted, there are many fluidic circuits in the prior art that can be used in the present invention to create many differing embodiments of the present invention.

The foregoing is considered as illustrative only of the principles of the invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as hereinafter set forth in the claims.

We claim:

1. A manually adjustable fluidic spray device, comprising:
    (a) a fluidic circuit base having a boundary surface with opposing edges left side and right side surfaces, a front surface and at least first, second and third primary projections extending from said base boundary surface, said first, second and third primary projections being configured and spaced apart from one another to provide flow passages therebetween and provide an interior geometry for said flow passages to define a fluidic circuit having a power nozzle and an interaction region located downstream of said power nozzle, and wherein said flow passages are proximate said base left side and right side surfaces and configured so that said fluidic circuit base flow passages have no edge boundaries defined in said left side and right side surfaces;
    (b) a primary housing having an outer surface with a front face that includes an opening to a primary housing socket cavity having a boundary surface that extends into said primary housing, wherein a portion of said socket cavity boundary surface has a sphere-shaped curvature;
    (c) a secondary housing having an spherical outer surface with a rear face opposing a front face that includes an opening to a secondary housing cavity having a planar boundary surface, wherein said secondary housing cavity's planar boundary surface extends from said front face opening to a rear face opening, and wherein said secondary housing cavity is configured to receive said fluidic circuit base with said fluidic circuit's first, second and third primary projections defining contact points with said secondary housing cavity's planar boundary surface, wherein said left side and right side surfaces are configured to define edge boundaries for said fluidic circuit base flow passages when said fluidic circuit base is inserted in said secondary housing's cavity; and
    (d) wherein said front portion of said secondary housing cavity defines a passage forming the interior geometry for a throat portion of said fluidic circuit.

2. The fluidic spray device as recited in claim 1, wherein a portion of said secondary housing outer boundary surface has an intermediate segment defining a spherical-shaped curvature.

3. The fluidic spray device as recited in claim 1, wherein said a primary housing has an outer surface with a front face that includes an opening to a primary housing socket cavity having an inner boundary surface that extends into said primary housing,
    wherein a portion of said socket cavity boundary surface has a sphere-shaped curvature configured to receive said sphere-shaped portion of said secondary housing intermediate boundary surface,
    wherein said socket cavity is further configured to accommodate said secondary housing in said primary housing cavity in such a manner that said sphere-shaped portions of said primary housing socket cavity and secondary housing boundary surface provide an adjustable ball and socket type of fitting between said portions so as to allow for a plurality of directional orientations of said secondary housing relative to said primary housing.

4. The fluidic spray device as recited in claim 3, wherein said secondary housing outer boundary surface is configured for press fit insertion into said primary housing's socket cavity.

5. A method for assembling the manually adjustable fluidic spray device of claim 1, said method comprising the steps of:
    (a) molding said fluidic circuit base with said boundary surface and said first, second and third primary projections configured and spaced to provide an interior geometry for, flow passages of a fluidic circuit having a power nozzle and an interaction region located downstream of said power nozzle;
    (b) molding said primary housing with said outer surface and said front face opening primary housing socket cavity;
    (c) molding said secondary housing with said secondary housing cavity planar boundary surface extending from said front face opening to said rear face opening, and wherein said secondary (d) aligning said fluidic circuit base with said fluidic circuit's primary projections in preparation for insertion to defining contact points with said secondary housing cavity's planar boundary surface; and (e) inserting said fluidic circuit base into said secondary housing's cavity; and then (f) inserting said secondary housing into said primary housing's socket cavity.

6. The method for assembling a manually adjustable fluidic spray device of claim 5, further comprising:

(g) manually adjusting said secondary housing's orientation within said primary housing to adjust the orientation of said fluidic spray device's outlet.

7. A manually adjustable fluidic spray device, comprising:

(a) a fluidic circuit base having a boundary surface with opposing left side and right side surfaces, a front surface and at least first, second and third primary projections extending from said base boundary surface in a selected projection direction, said first, second and third primary projections being configured and spaced apart from one another to provide a fluidic circuit filter array with flow passages therebetween;

wherein said fluidic circuit base boundary surface also has at least fourth and fifth primary projections extending from said base boundary surface in said selected projection direction, said fourth and fifth primary projections being configured and spaced apart from one another to provide a fluidic circuit oscillator array downstream of said filter array with flow passages therebetween and providing an interior geometry for said flow passages to define a power nozzle and an interaction region located downstream of said power nozzle, and wherein said flow passages are proximate said base left side and right side surfaces and configured so that said fluidic circuit base flow passages have no edge boundaries defined in said left side and right side surfaces;

(b) a primary housing having an outer surface with a front face that includes an opening to a primary housing socket cavity having a boundary surface that extends into said primary housing, wherein a portion of said socket cavity boundary surface has a sphere-shaped curvature;

(c) a secondary housing having an spherical outer surface with a rear face opposing a front face that includes an opening to a secondary housing cavity having a planar boundary surface, wherein said secondary housing cavity's planar boundary surface extends from said front face opening to a rear face opening, and wherein said secondary housing cavity is configured to receive said fluidic circuit base with said fluidic circuit's first, second and third primary projections defining contact points with said secondary housing cavity's planar boundary surface, wherein said left side and right side surfaces are configured to define edge boundaries for said fluidic circuit base flow passages when said fluidic circuit base is inserted in said secondary housing's cavity; and (d) wherein said front portion of said secondary housing cavity defines a passage forming the interior geometry for a throat portion of said fluidic circuit.

8. The fluidic spray device as recited in claim 7, wherein a portion of said secondary housing outer boundary surface has an intermediate segment defining a spherical-shaped curvature.

9. The fluidic spray device as recited in claim 7, wherein said a primary housing has an outer surface with a front face that includes an opening to a primary housing socket cavity having an inner boundary surface that extends into said primary housing, wherein a portion of said socket cavity boundary surface has a sphere-shaped curvature configured to receive said sphere-shaped portion of said secondary housing intermediate boundary surface, wherein said socket cavity is further configured to accommodate said secondary housing in said primary housing cavity in such a manner that said sphere-shaped portions of said primary housing socket cavity and secondary housing boundary surface provide an adjustable ball and socket type of fitting between said portions so as to allow for a plurality of directional orientations of said secondary housing relative to said primary housing.

* * * * *